United States Patent [19]
Church et al.

[11] Patent Number: 5,366,415
[45] Date of Patent: Nov. 22, 1994

[54] HYDRAULIC BELT TENSIONER

[75] Inventors: Kynan L. Church, Ceresco; David W. Deppe, Marshall; Richard L. Madden, Marshall; Nandakumar Srinivasan, Marshall, all of Mich.

[73] Assignee: Eaton Corporation, Cleveland, Ohio

[21] Appl. No.: 161,850

[22] Filed: Dec. 6, 1993

Related U.S. Application Data

[63] Continuation-in-part of Ser. No. 31,188, Mar. 12, 1993, Pat. No. 5,304,099.

[51] Int. Cl.⁵ ............................................. F16H 7/08
[52] U.S. Cl. ................................... 474/110; 474/138
[58] Field of Search ........ 474/101, 109, 110, 113–117, 474/133, 135, 136, 138

[56] References Cited

U.S. PATENT DOCUMENTS 4,911,679  3/1990  Inoue et al. ........................ 474/110
4,986,796  1/1991  Kawashima et al. ................ 474/101
5,073,149  12/1991 Maruyama et al. .................. 474/104
5,073,150  12/1991 Shimaya ............................. 474/110
5,234,383  8/1993  Harada et al. ....................... 474/110

*Primary Examiner*—Michael Powell Buiz
*Attorney, Agent, or Firm*—Frank M. Sajovec

[57] ABSTRACT

A hydraulic belt tensioner operating on pressurized lubricating oil in an internal combustion engine. The tensioner includes a ratchet mechanism which locks the output member of the tensioner in a fixed position when the engine is not operating and which is disengaged when the engine is operating and the lubricating oil is pressurized. A seal is provided to prevent oil from escaping from the unit. The invention further includes slots formed in a plunger element of the tensioner which are effective to dissipate air which tends to become entrapped under the plunger when the engine is initially started.

17 Claims, 1 Drawing Sheet

HYDRAULIC BELT TENSIONER

The present invention is a continuation-in-part application of application Ser. No. 031,188 to Deppe, et al. entitled "Hydraulic Chain Tensioner", that was filed in the U.S. Patent and Trademark Office on Mar. 12, 1993, now U.S. Pat. No. 5,304,099.

This invention relates to hydraulic belt tensioners for internal combustion engines, and more particularly to a sealed hydraulic belt tensioner using engine oil for operation.

Tensioners for timing chains and belts in internal combustion engines are well known in the art, particularly those wherein hydraulic pressure is employed to provide a force directly against a movable guide which bears against the chain or belt. An example of a typical chain tensioner is shown in U.S. Pat. No. 4,874,352 to Suzuki, while an example of a typical belt tensioner is shown in U.S. Pat. No. 5,073,149 to Maruyama, et al.

In the prior art, a clear distinction has been drawn between chain tensioners and belt tensioners as applied to the valve timing system in an internal combustion engine. In a valve timing system employing a chain, the chain requires lubrication and is thus located in an environment wherein engine oil is present. In such applications, it is convenient and efficient to employ a tensioner which operates on engine oil, with the engine oil being permitted to flow out of the tensioner and onto the chain via leakdown paths and vents.

In valve timing systems which employ a toothed belt, no engine oil can be permitted to contact the belt; therefore, the belt is enclosed in an oil-free environment. Accordingly, in belt-driven systems it has become a practice to employ tensioners which operate on a self-contained oil supply, with diaphragms or the like employed to prevent oil from escaping from the tensioner, such as shown in U.S. Pat. No. 5,073,149 referred to above.

While the state of the art in seal design is such that it can be expected that a commercially available seal can be effectively adapted to an engine oil actuated belt tensioner, there is a potential for air entrapment in the high pressure chamber of such devices, particularly on initial installation. More specifically, when the tensioner is initially installed in an engine and the unit is pressurized with engine oil it is expected that entrapped air in the high pressure chamber will escape via the leakdown clearance between the plunger and the plunger bore; however, it has been found that air bubbles tend to become trapped in the area of the check ball retainer, the presence of which can cause erratic operation of the tensioner on initial start-up of the engine.

Although such air bubbles will eventually become dislodged, any erratic behavior on initial start-up is not acceptable to the engine manufacturer. Accordingly it is an object of the invention to provide a sealed belt tensioner operating on engine oil which is capable of efficiently of purging the high pressure chamber thereof of entrapped air under all operating conditions, including initial start-up of the engine.

A tensioner has been developed for use in a chain driven timing system which provides a retractable ratchet which engages the output member of the tensioner when the engine is shut down to maintain the position of the tensioner and thus the chain tension, but which retracts when the engine is operating. In accordance with the invention, the ratchet is in the form of a hydraulic plunger which is spring-loaded into engagement with the output member, and which is disengaged by engine oil pressure acting on the plunger to overcome the spring force. Accordingly, when the engine is operating, the ratchet is disengaged, and when the engine is shut down, the ratchet engages to maintain the tensioner in an operative position during such shut down. Such tensioner is described in U.S. patent application Ser. No. 031,188.

It would be most desirable to adapt the above ratchet mechanism to a prior art hydraulic belt tensioner; however, since the known hydraulic belt tensioners operate on a self-contained oil supply, such adaptation is not feasible. Accordingly, it is a further object of the present invention to provide a hydraulic belt tensioner which operates on engine oil, which incorporates an engine-oil-actuated ratchet mechanism to maintain belt tension when the engine is shut down, and which incorporates an effective sealing system in order to maintain an oil free environment for the belt drive system.

Other objectives and advantages of the invention will be apparent from the following description when considered in relation to the accompanying drawing, wherein.

Figure 1:
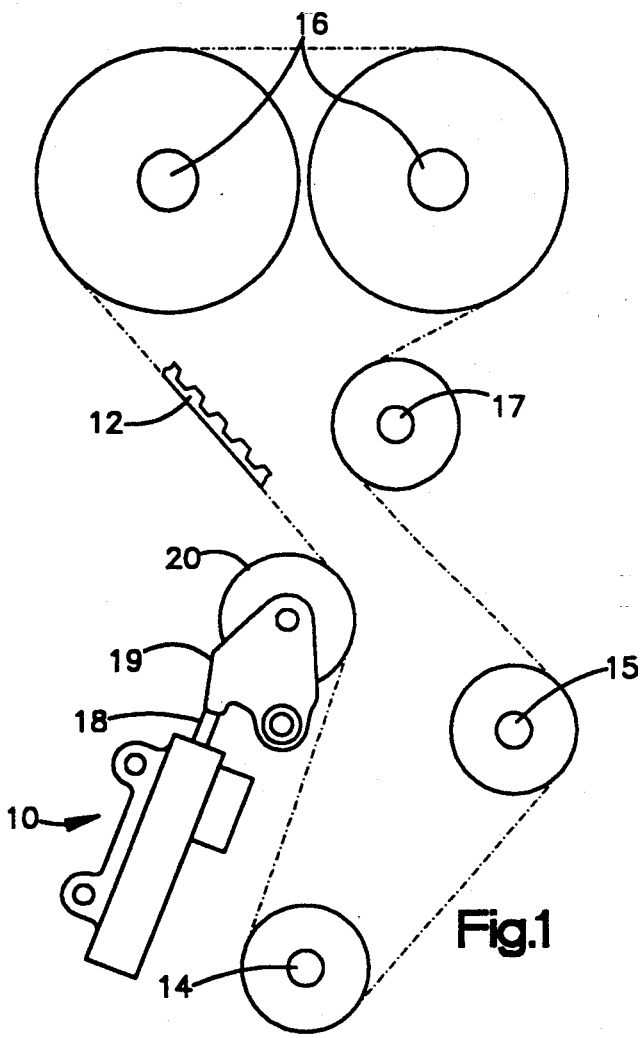
FIG. 1 is a schematic elevation view illustrating the application of the invention to an internal combustion engine.

Referring to FIG. 1, there is illustrated a belt tensioner assembly 10 bolted or otherwise attached to an internal combustion engine (not shown) in position to maintain tension in a timing belt 12 connecting the crankshaft 14 of the engine to one or more camshafts 16. In a typical engine the belt 12 will also drive a water pump 15 or other accessory and may include an idler pulley 17. In the typical application illustrated, an output element 18 of the belt tensioner assembly bears against a pivotally mounted bracket 19 on which an idler pulley 20 which bears against the outside of the belt is mounted.

Figure 2:
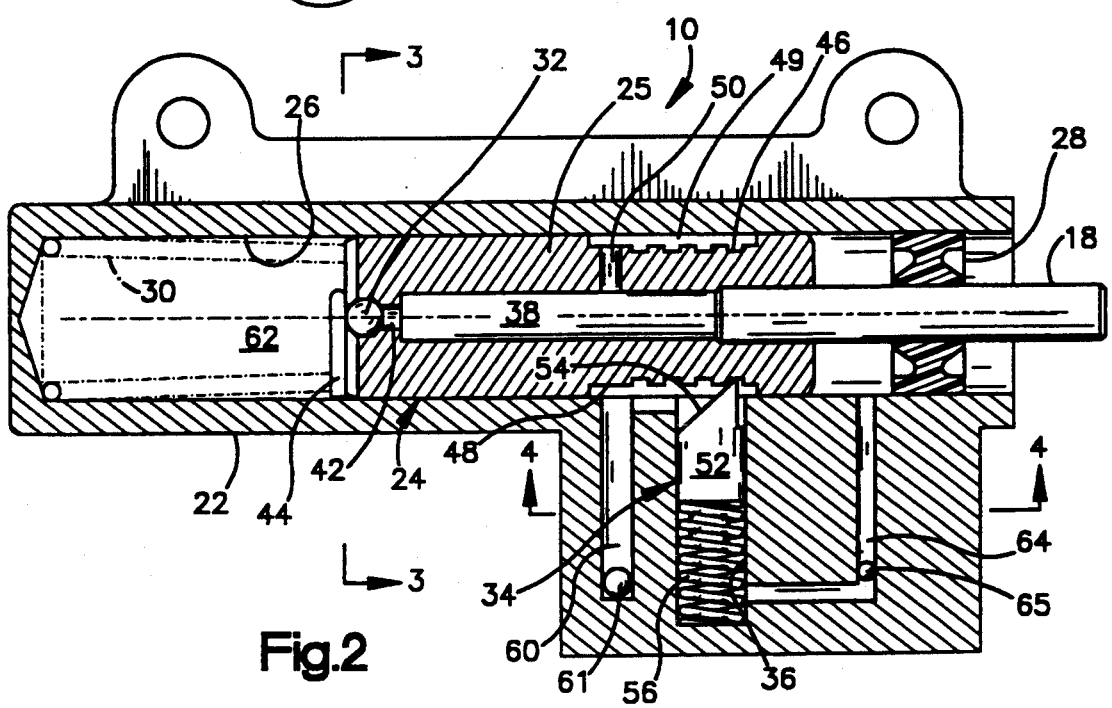
FIG. 2 is a cross-sectional view of the invention.

Referring to FIG. 2, the belt tensioner assembly comprises a housing 22, a plunger assembly 24 received in a blind bore 26 formed in the housing, a spring 30 acting between the housing and the plunger and biasing the plunger outward of the bore, a check ball 32 in the plunger, and a ratchet assembly 34 received in a bore 36 formed in the housing intersecting the bore 26, and a seal 28.

The plunger assembly 24 comprises an elongated cylindrical member 25 having a bore defining an oil passage 38, a slightly larger counterbore into which a rod defining the output member 18 is received, a second bore in which the check ball is received, and a third bore 42 connecting the passage 38 with the check ball bore, and the output element 18. The output element 18 is illustrated herein as a rod which can be press fit or otherwise fixed into the plunger; however, since it is restrained from axial movement relative to the plunger when installed in an engine, it can also be a slip fit in the plunger. The check ball is retained by the end coil 44 of the spring 30 which is deflected inwardly to contact the ball. The fit between the outer diameter of the plunger 25 and the bore 26 defines a controlled leakdown surface as is well known in the design of hydraulic tensioners. Ratchet teeth in the form of a plurality of circumferential grooves 46 are formed in an area of reduced diameter 48 of the plunger for engagement by the ratchet assembly, the volume between the area 48 and the bore 26 defining an annular chamber 49. A cross bore 50 is formed in the plunger to provide a flow path between the annular chamber 49 and the passage 38.

Figure 4:
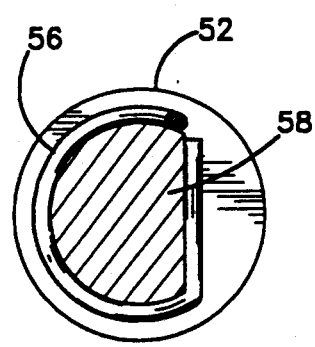
FIG. 4 is a sectional view taken along line 4—4 of FIG. 2.

The ratchet assembly 34 comprises a ratchet pawl in the form of a plunger 52 received in the bore 36 and having an angled end face 54 formed thereon to define a projecting pawl tooth engageable with the grooves 46, and a spring 56 biasing the ratchet plunger into engagement with the sleeve. Referring to FIG. 4, the ratchet plunger 52 has a D-shaped projection 58 formed thereon, and the end coil of the spring 56 is similarly D-shaped to maintain the angular position of the ratchet plunger.

Referring again to FIG. 2, pressurized engine oil enters the passage 38 via annular chamber 49 through a passage 60 which is intersected by a port 61 which is in sealed communication with the engine oil supply. When the belt 12 slackens, the spring 30 extends the plunger, creating a low pressure in chamber 62, which causes the check ball 32 to unseat, allowing oil to flow into the chamber 62. When the belt tightens, a force is applied to the plunger causing the plunger to move inward of the housing 22. This inward motion causes a pressure rise in the chamber 62 causing the check ball to reseat and stop the flow of oil into the chamber. As the load applied to the plunger increases, the pressure in the chamber 62 increases due to the fact that it is sealed except for a small amount of oil which leaks past the leakdown surface between the plunger and the bore 26. The resultant high pressure in the chamber 62 resists the inward motion of the plunger, maintaining the tension in the belt 12.

Figure 3:
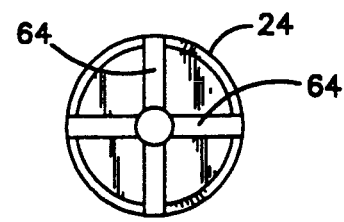
FIG. 3 is an elevation view of the plunger of the invention taken at line 3—3 of FIG.2.

Referring to FIGS. 2 and 3, one or more diametric slots 64 are formed in the inner end face of the plunger 25 to assist in purging the chamber 62 of air during initial start-up of the engine. The slots provide channels for directing air, which may collect in the form of bubbles in the area of the check-ball-retaining coil 44, to the leakdown surface defined between the plunger 25 and the bore 26. While the check ball retainer illustrated herein is defined by the end coil 44, it can be appreciated that the above problem can be expected to exist with other forms of ball retainers as well.

When the engine is operating, pressurized oil is also supplied to the volume defined under the angled face 54 of the ratchet plunger. The oil pressure acting against the face of the ratchet plunger will exceed the force of the ratchet spring 56 causing the pawl 52 to become disengaged from the plunger 25. Accordingly, so long as the engine is running and oil pressure is maintained, the ratchet assembly will remain disengaged and will not affect the normal operation of the tensioner. When the engine is shut down, the static load of the belt acting on the sleeve 18 will be greater than the force of the spring 30, causing the tensioner to collapse; however, since oil pressure is no longer maintained at the face of the ratchet plunger, the spring 56 will again be effective to bias the plunger 52 into engagement with the plunger 18. As the plunger collapses inward under the force of the belt, the pawl 52 will engage one of the grooves 46, preventing further collapse of the plunger and maintaining that position of the tensioner until the engine is restarted.

In accordance with the invention, the tensioner 10 is sealed to keep the belt 12 from being exposed to engine oil. To effect such seal, seal assembly 28 is fixed in sealing engagement with the bore 26 and includes a sliding seal element in engagement with the output member 18. To further insure that oil does not leak past the seal, a vent passage 64 intersecting the bore 26 behind the seal is provided in the housing 22. The passage 64 opens into the ratchet plunger bore 36 to vent the volume behind the plunger 52 and is vented back to the crankcase (not shown) of the engine via an intersecting port 65.

We claim:

1. A hydraulic belt tensioner assembly for an internal combustion engine comprising a housing having a closed axial first bore formed therein; a plunger received in said first bore, the volume between the closed end of said bore and a first end of said plunger defining a first chamber; a second chamber formed in said plunger, the clearance between said plunger and said bore defining a controlled leakdown path therebetween; check valve means received in said plunger operable to provide a flowpath only in the direction from said second chamber to said first chamber; passage means operable to direct pressurized oil from said engine to said second chamber; seal means acting between said plunger and said first bore effective to prevent the flow of oil outward of said housing; and one or more slots formed in said first end of said plunger, said slots extending from substantially the center of said first end to the outside diameter of said plunger.

2. Apparatus as claimed in claim 1, in which said check valve means comprises a ball received in a counterbore formed in said first end of said plunger, including means for retaining said ball in said counterbore, at least one of said one or more slots intersecting said counterbore.

3. Apparatus as claimed in claim 2, including means received in said first chamber biasing said plunger outward of said housing.

4. Apparatus as claimed in claim 3, in which said biasing means comprises a coil spring acting between the closed end of said housing and said first end of said plunger, an end coil of said spring also defining said means for retaining said ball.

5. Apparatus as claimed in claim 1 in which said plunger includes a cylindrical rod extending outward of said housing from a second end of said plunger, and wherein said seal means comprises a seal element sealingly fixed to said rod and in dynamic sealing engagement with said housing.

6. Apparatus as claimed in any one of claims 1-5 including ratchet means engageable with said plunger to inhibit movement of said plunger into said housing, and means for disengaging said ratchet means when said engine is operating.

7. Apparatus as claimed in claim 6 in which said ratchet means comprises means defining ratchet teeth formed on said plunger, means defining a ratchet pawl received in said housing and engageable with said teeth means, and means biasing said ratchet pawl means into engagement with said teeth.

8. Apparatus as claimed in claim 7, wherein said means defining a ratchet pawl comprise a cylindrical member received in a second bore formed in said housing and having a tooth-engaging projection formed on one end thereof, and wherein said biasing means comprises a spring acting between said housing and the opposite end of said cylindrical member.

9. Apparatus as claimed in claim 8 wherein said means for disengaging said ratchet means comprises means for conducting said pressurized engine oil to said second bore, said pressurized oil acting against said cylindrical member in a direction opposing the force of said spring.

10. A hydraulic tensioner assembly for an internal combustion engine comprising a housing; a hydraulic tensioner module received within said housing, said module including an axially extendible and retractable plunger operatively engageable with an endless drive element of said engine; ratchet means engageable with said plunger to inhibit retraction of said plunger; means for disengaging said ratchet means when said engine is operating; means for supplying pressurized engine oil to said module, and sealing means acting between said plunger and said housing and operable to confine said oil within said housing.

11. Apparatus as claimed in claim 10 in which said plunger includes a cylindrical rod extending outward of said housing, and wherein said sealing means comprises a seal element sealingly fixed to said having and in dynamic sealing engagement with said rod.

12. Apparatus as claimed in claim 10 or 11, in which said ratchet means comprises means defining ratchet teeth formed on said plunger, means defining a ratchet pawl received in said housing and engageable with said teeth means, and means biasing said ratchet pawl means into engagement with said teeth.

13. Apparatus as claimed in claim 12, wherein said means defining a ratchet pawl comprise a cylindrical member received in a bore formed in said housing and having a tooth-engaging projection formed on one end thereof, and wherein said biasing means comprises a spring acting between said housing and the opposite end of said cylindrical member.

14. Apparatus as claimed in claim 13 wherein said means for disengaging said ratchet means comprises means for conducting said pressurized engine oil to said bore, said pressurized oil acting against said cylindrical member in a direction opposing the force of said spring.

15. A hydraulic tensioner for an endless drive element in an internal combustion engine comprising a housing, a plunger slidingly received in a blind bore formed in said housing, a chamber defined by the volume between the bottom of said bore and a first end of said plunger, a spring acting between the bottom of said bore and said plunger biasing said plunger outward of said housing, a second chamber formed within said plunger; passage means providing a flow path between said first chamber and said second chamber, a check valve operable to shut off flow from said first chamber to said second chamber when said first chamber is at a higher pressure than said second chamber, means conducting pressurized engine oil to said second chamber, means defining ratchet teeth formed on said plunger, a ratchet pawl received in said housing and engageable with said ratchet teeth, a spring biasing said pawl into engagement with said teeth, means responsive to the pressure of said engine oil to disengage said pawl from said teeth, and seal means acting between said plunger and said housing to prevent the escape of said engine oil.

16. Apparatus as claimed in claim 15, wherein said plunger includes a region of reduced diameter, said region defining an annular chamber between said housing and said plunger in communication with said second chamber, and said ratchet teeth being formed in said region of reduced diameter; and said ratchet pawl is defined by a cylindrical member received in a bore, in communication with said annular chamber, said means responsive to engine oil pressure being defined by oil pressure acting against said cylindrical member.

17. Apparatus as claimed in claims 15 or 16 in which plunger includes a cylindrical rod extending outward of said housing, said seal being sealingly fixed to said housing and in dynamic sealing engagement with said shaft.

* * * * *